United States Patent [19]
Hacena et al.

[11] Patent Number: 6,009,329
[45] Date of Patent: Dec. 28, 1999

[54] SYSTEM AND METHOD FOR HUNTING TRUNK LINES WITH A GSM WIRELESS BASE STATION AND GSM WIRELESS INFRASTRUCTURE EMPLOYING THE SAME

[75] Inventors: Farid Hacena, Aurora; James E. Hoch, Warrenville; Alex Lawrence Wierzbicki, Bolingbrook, all of Ill.

[73] Assignee: Lucent Technologies, Inc., Murray Hill, N.J.

[21] Appl. No.: 08/892,801

[22] Filed: Jul. 15, 1997

[51] Int. Cl.$^6$ ........................................................ H04Q 7/20
[52] U.S. Cl. ........................... 455/445; 455/560; 379/221
[58] Field of Search ................................... 455/422, 445, 455/433, 450, 452, 458, 509, 520, 524, 560, 561, 507, 517; 379/59, 58, 60, 269, 221, 207

[56] References Cited

U.S. PATENT DOCUMENTS

| | | | |
|---|---|---|---|
| 4,694,487 | 9/1987 | Chang et al. | 379/269 |
| 4,747,130 | 5/1988 | Ho | 379/269 |
| 5,042,027 | 8/1991 | Takase et al. | 370/54 |
| 5,101,451 | 3/1992 | Ash et al. | 379/221 |
| 5,119,366 | 6/1992 | Ardon et al. | 370/54 |
| 5,450,482 | 9/1995 | Chen et al. | 379/207 |
| 5,590,176 | 12/1996 | Agarwal et al. | 379/59 |

*Primary Examiner*—Wellington Chin
*Assistant Examiner*—Pablo N. Tran

[57] ABSTRACT

A system and method, associated with a wireless base station system ("BSS") coupled to a mobile service center ("MSC") via a plurality of trunk lines, that allow the BSS to hunt the plurality of trunk lines for available channels to carry calls from the BSS to the MSC and a Groupe Speciale Mobile ("GSM") wireless infrastructure employing the system or the method. The system includes: (1) a signaling controller, associated with the BSS, that sends a command signal to the MSC to cause the MSC to bypass hunting for the available channels, the MSC acknowledging bypassing of the hunting to the signaling controller and (2) a trunk hunting controller, associated with the BSS, that is enabled when the MSC acknowledges the bypassing of the hunting to allow the BSS to hunt the plurality of trunk lines for the available channels to carry the calls from the BSS to the MSC, the trunk hunting controller capable of utilizing the trunk lines more efficiently than the MSC.

20 Claims, 3 Drawing Sheets

SYSTEM AND METHOD FOR HUNTING TRUNK LINES WITH A GSM WIRELESS BASE STATION AND GSM WIRELESS INFRASTRUCTURE EMPLOYING THE SAME

TECHNICAL FIELD OF THE INVENTION

The present invention is directed, in general, to telecommunications and, more specifically, to a system and method for hunting trunk lines with a Groupe Speciale Mobile ("GSM") wireless base station system ("BSS") and a GSM wireless infrastructure employing the same.

BACKGROUND OF THE INVENTION

Wireless telecommunications networks are built to accommodate mobile telephones and personal communication systems (collectively, mobile telephones and PCSs are referred to as "mobile stations") that are typically low powered. The mobility and low power requirements of these mobile stations impose major design constraints, not only upon these devices themselves, but upon BSS units and wireless telephony switching offices, commonly referred to as Mobile Switching Centers ("MSCs"), that provide communication means between the mobile unit and some other wired/wireless station.

Turning momentarily to FIG. 1, illustrated is a block diagram of a prior art infrastructure (generally designated 10) that includes a plurality of mobile stations 105, a plurality of Base Transceiver Stations ("BTSs") 110, a BSS 115, a speech transcoder unit ("STU") 120, a plurality of MSCs 125 and a Public Switched Telephone Network ("PSTN") 130, all of which are directly or indirectly linked together to form infrastructure 10.

BSS 115 is associated with multiple BTSs 110 (e.g., transceiver sites or cells) and STU 120 for communication between mobile stations 105 and a given MSC 125. Generally speaking, many BTSs 110 are built within a defined geographic area, so that BTS density causes each mobile station to be "close" to at least one BTS 110 at all times.

Wireless communication systems employ multiple BTSs 110 linked to a central computer associated with MSC 125 for coordination. BTSs 110 also overlap one another and typically operate at different transmitting and receiving frequencies to eliminate interference. Conventionally, wireless communication systems (e.g., Frequency Division Multiple Access ("FDMA"), Time Division Multiple Access ("TDMA"), etc.) commonly separate multiple wireless transmissions over a finite frequency range, allocating a discrete amount of frequency bandwidth to each mobile station to permit many concurrent conversations.

Each mobile station 105 is usually assigned a specific time slice/slot for transmission, occupying a finite amount of available frequency spectrum—the wireless telephony frequency band consists of several hundred channels/frequency slots available for conversations.

Within each BTS 110, approximately several dozen channels are available for mobile stations 105, different channels are therefore allocated for neighboring cell sites, allowing for re-use of frequencies with only minor amounts of interference. When a mobile station 105 is activated, it hunts (or searches) available communication channels for the strongest signal and locks onto it (note, if signal strength fades while in motion, mobile station 105 automatically switches (a "handoff") signal frequencies or BTSs 110, as necessary).

With reference to FIG. 1, BSS 115 includes a 64K time slot interchanger ("TSI") 160 and a plurality of subrate switching equipment modules 165. In addition, a select channel for communication with BTS 110 is one of wireless communication channels 140. Conventionally, the selected wireless channel 140 communicates an incoming call from mobile station 105 to BTS 110, BTS 110 in turn communicates the same to BSS 115 over one of communications trunks 145, BSS 115 communicates the same to STU 120 over one of communications trunks 150, and STU 120 in turn communicates the same to MSC 125 over one of communications trunks 155. The incoming channel on communications trunk 145 (channel A of channels A–D in this example) is chosen by BTS 110 and the outgoing channel on communications trunk 150 (channel E of channels E–H in this example) is chosen by MSC 125. This results in connection A–E through ESS 115 via module 165A.

Assume now that a second incoming call from the same BTS 110, and in the same BTS timeslot as the prior incoming call, must be connected through BSS 115 to STU 120. As MSC 125 is conventionally responsible for selecting one of communications trunks 150 (and hence STU 120 communications channel), it is very unlikely that an optimal connection in relation to existing connections (A–E) through BSS 110 may be made. Most often random connections will be made, resulting in connection such as B–J through BSS 115 via modules 165A, 165C.

If intelligent means existed to select a connection through BSS 115 to STU 120, an optimal selection would have been through channel F, allowing reuse of connection A–E to thereby conserve communications system resources (e.g., connection B–F) and subrate switching resources (e.g., module 165C). Commonly, the trunks for mobile station originated calls are hunted by MSC 125, this in point of fact a standard procedure of the GSM wireless standard. Such procedures, however, do not encourage an efficient use of BSS 115 and MSC 125 resources. There consequently exists a need in the art for improved systems and methods that allow BSS 115 to hunt for trunks used by call originated by mobile station 105 to increase MSC 125 call capacity and decrease waste of BSS 115 communications resources.

SUMMARY OF THE INVENTION

To address the above-discussed deficiencies of the prior art, the present invention provides a system and method, associated with a BSS coupled to an MSC via a plurality of trunk lines, that allow the BSS to hunt the plurality of trunk lines for available channels to carry calls from the BSS to the MSC and a wireless infrastructure employing the system or the method.

The system includes: (1) a signaling controller, associated with the BSS, that sends a command signal to the MSC to cause the MSC to bypass hunting for the available channels, the MSC acknowledging bypassing of the hunting to the signaling controller and (2) a trunk hunting controller, associated with the BSS, that is enabled when the MSC acknowledges the bypassing of the hunting to allow the BSS to hunt the plurality of trunk lines for the available channels to carry the calls from the ESS to the MSC, the trunk hunting controller capable of utilizing the trunk lines more efficiently than the MSC.

The present invention therefore introduces a way of increasing subrate switch utilization by employing the BSS to hunt for channels in trunks that are to carry calls outbound from the BSS. Since the system and method of the present invention are associated with the BSS, they are afforded a better view of how resources within the BSS are being used and how marginal requirements for those resources (in the form of new outbound calls to be made) can be accommodated in the most efficient manner. As will be set forth in greater detail, the MSC may be released to perform other vital tasks associated with routing calls.

In one advantageous embodiment, the MSC bypasses the hunting and the trunk hunting controller allows the BSS to hunt only when the MSC and the BSS are compatible. "Compatible," for purposes of the present invention, means that the MSC and the BSS can cooperate to reassign the hunting task between the MSC and the ESS. "Compatible," for practical purposes, means that the MSC and BSS were manufactured by the same company.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings wherein like numbers designate like objects, in which.

DETAILED DESCRIPTION

Figure 2:
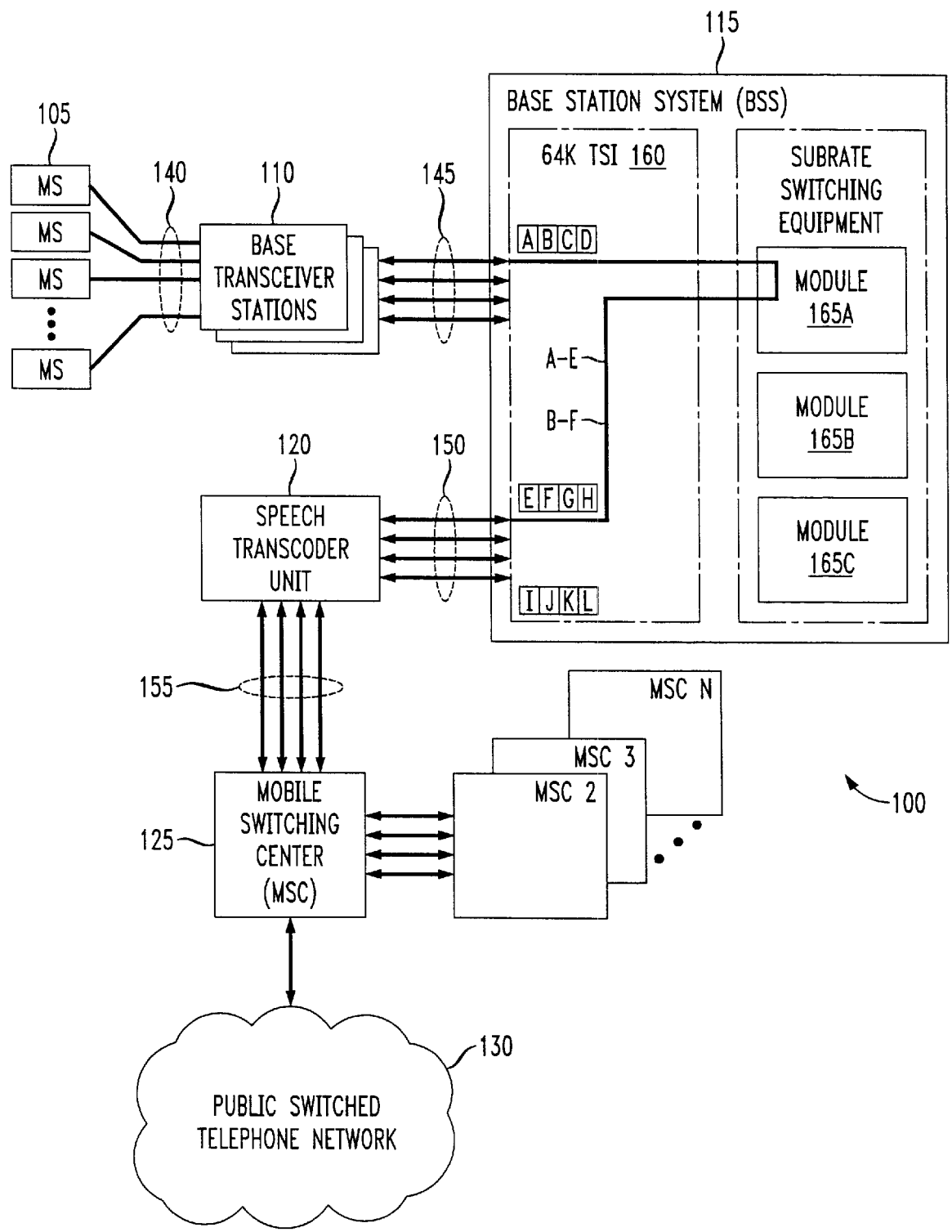
FIG. 2 illustrates a block diagram of an exemplary infrastructure, such one operating according to the GSM wireless standard, that introduces a way of increasing trunk utilization according to the principles of the present invention.

Turning now to FIG. 2, illustrated is a block diagram of an exemplary infrastructure 100, such as that of GSM, that introduces a way of increasing trunk utilization by employing BSS 115 to hunt for channels in a plurality of trunks 150 that are to carry calls outbound from BSS 115, all according to the present invention. Exemplary infrastructure 100 again includes mobile stations 105, BTSs 110, BSS 115, STU 120, MSCs 125 and PSTN 130, all of which are linked together to form infrastructure 100. Likewise, exemplary BSS 115 includes 64K TSI 160 and subrate switching equipment modules 165. Note that the term "include," as used herein, means inclusion without limitation, and the term "or," as used herein, is inclusive, meaning and/or. In addition, although STU 120 is interposed between BSS 115 and MSC 125, those skilled in the art will understand that STU 120 is optional.

According to the illustrated embodiment, BSS 115 and, more particularly, subrate switching equipment modules 165 (possibly in association with conventional home and visitor location registers) cooperate to hunt the plurality of trunk lines 150 for available channels to carry incoming calls from BSS 115 to MSC 125. TSI 160 and modules 165 cooperate to provide a signaling controller (shown in FIG. 3) that sends a command signal to MSC 125 causing MSC 125 to (1) bypass hunting for the available channels (in accordance with the approach described with reference to the prior art) and (2) acknowledge the same to BSS 115. TSI 160 and modules 165 again cooperate to provide a trunk hunting controller (shown in FIG. 3) that is enabled in response to MSC 125 acknowledging that it has bypassed hunting for available channels, and allows ESS 115 to hunt trunk lines 150, 155 for the available channels to carry calls from BSS 115 to MSC 125. In one embodiment, the available channels over trunk lines 150, 155 are subrate channels; of course, the channels may alternatively be separate physical lines in a conventional multi-line trunk.

The trunk hunting controller is capable of utilizing trunk lines 150, 155 more efficiently than MSC 125. For instance, referring to the prior example, recall that a first call resulted in a connection A–E through BSS 115 via module 165a. According to the present invention, and the illustrated embodiment, if a second call originating from the same BTS 110, and in the same BTS timeslot, as the first call, BSS 115 would select a connection B–F, thereby conserving communications system and module 165 resources.

In the context of incorporating the principles of the present invention into conventional infrastructure, once BSS 115 hunts and selects a "best" trunk for its outgoing call, it can relay the same to MSC 125 by including a controller identification code ("CIC," such as for GSM systems) in any message and communicate the same to MSC 125. In MSC 125, upon receiving the CIC, MSC 125 saves the CIC, marks selected "best" trunk as "busy" and proceeds with the existing protocol, communicating the call.

One important aspect of the illustrated embodiment is that MSC 125 is selectively relieved from hunting trunks for mobile station 105 originated calls; it is implicit that MSC 125 real-time capacity will increase, which is dependant upon MSC 125 architecture. For example, the real time capacity increase for a conventional 5ESS Switch (AM module) may be approximately 30% to 50%. This real time capacity increase should increase MSC 125 capability, which can lower general costs associated therewith. This provides a more efficient means to allocate resources within BSS 115, releasing MSC 125, in part, to perform other vital tasks associated with routing calls. Note that the phrase "associated with," and derivatives thereof, as used herein, may mean to include within, interconnect with, contain, be contained within, connect to or with, couple to or with, be communicable with, juxtapose, cooperate with, interleave, be a property of, be bound to or with, have, have a property of, or otherwise cooperate in accordance with the principles of the present invention or an embodiment incorporating the same.

Another important aspect of the illustrated embodiment is that BSS 115, by hunting for a trunk 150 for a mobile station originated call, is more likely to select an optimal path, requiring the least subrate switching equipment. This enhances its real time capacity by hunting one subrate switching equipment module 165, instead of more than one per call (set forth hereinabove with reference to prior art FIG. 1 and related discussion).

Figure 1:
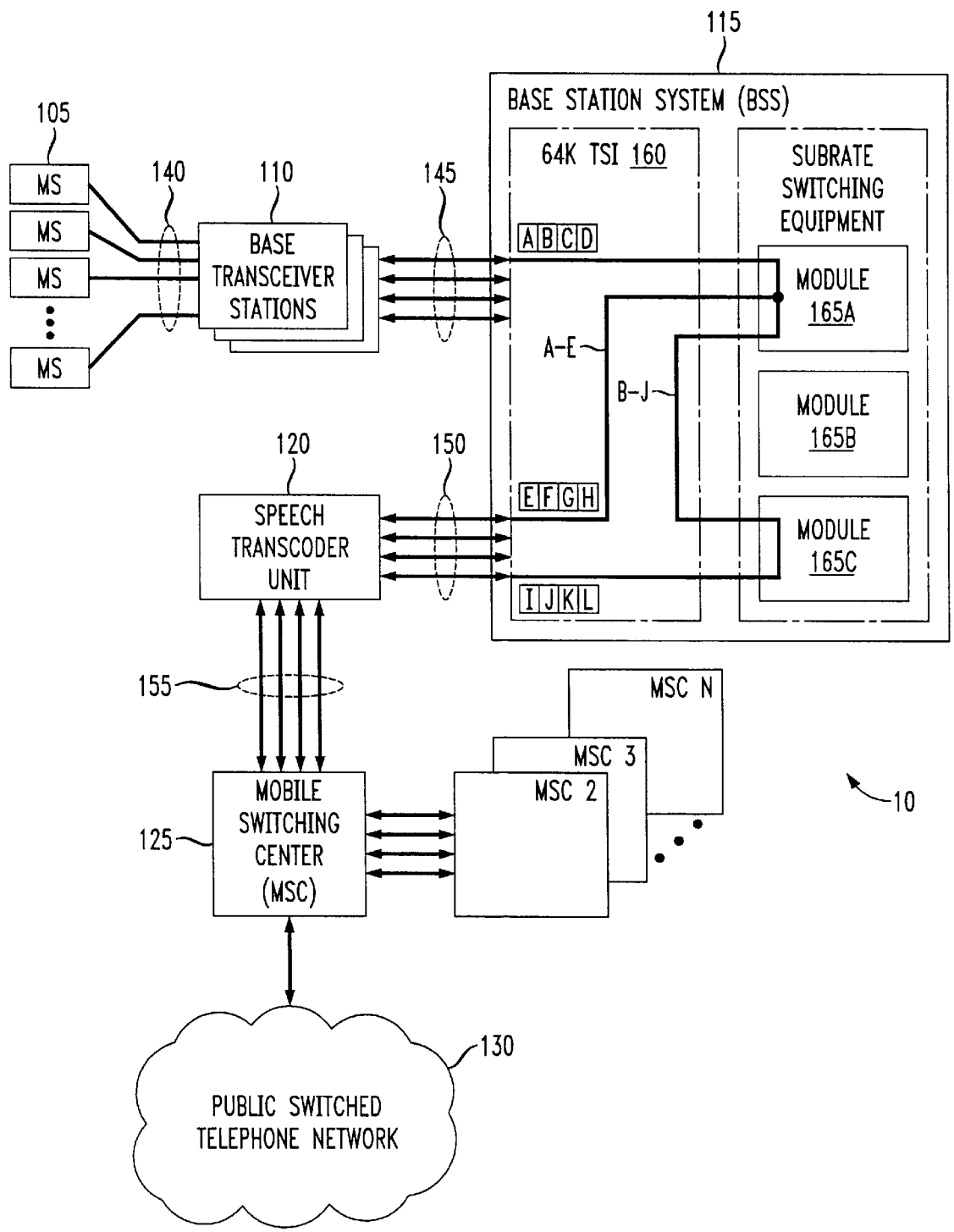
FIG. 1 illustrates a block diagram of a prior art infrastructure that includes a plurality of mobile stations, BTSs, a BSS, a STU, a plurality of MSCs and a PSTN.
Figure 3:
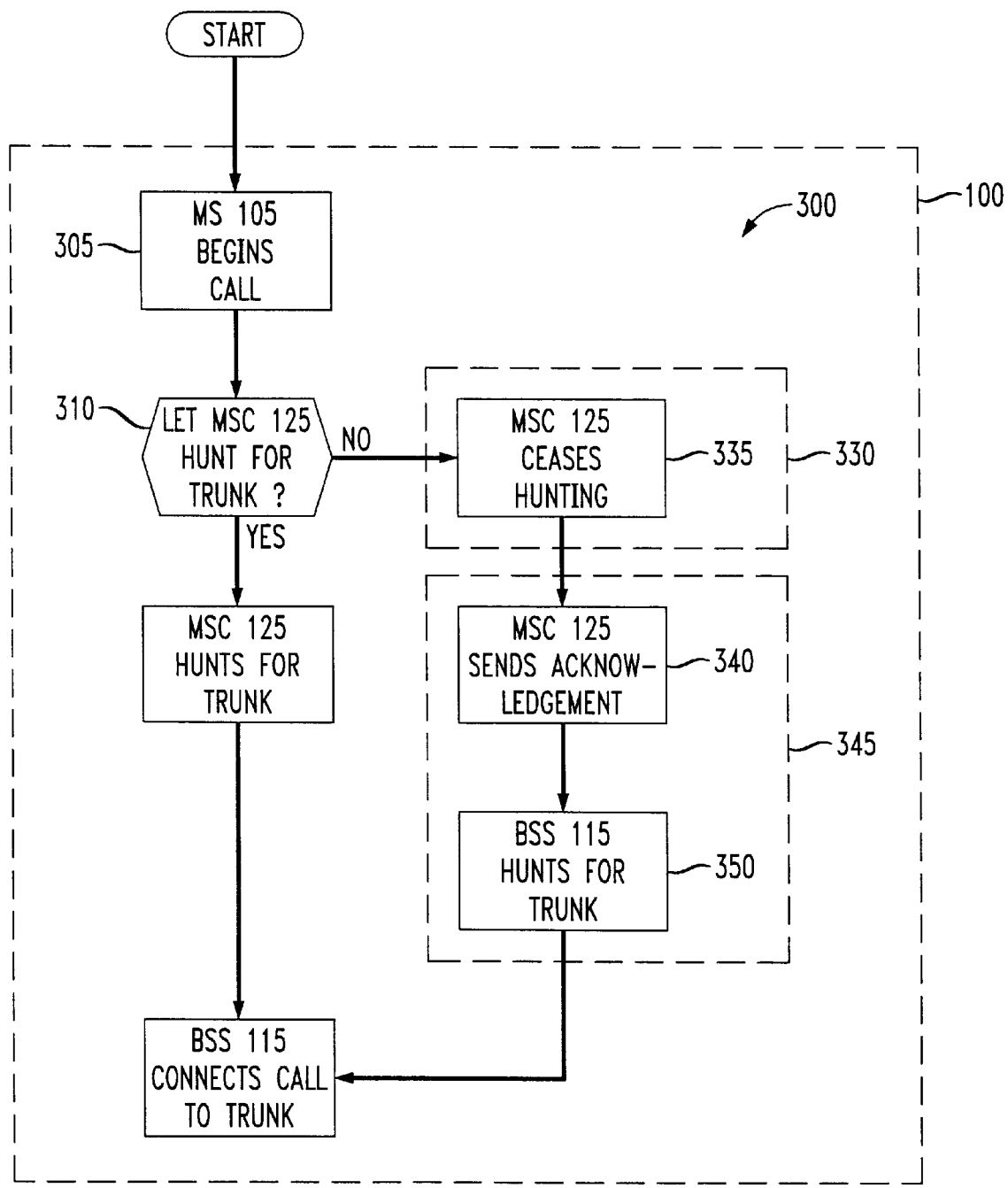
FIG. 3 illustrates a flow diagram of an exemplary method of operating the infrastructure of FIG. 2 to increase trunk utilization according to the principles of the present invention.

Turning now to FIG. 3, illustrated is a flow diagram of an exemplary method (generally designated 300) of operating infrastructure 100 of FIG. 2 to increase trunk utilization according to the principles of the present invention. For purposes of illustration, concurrent reference is made to the embodiment described with reference to FIG. 2. It should be noted that FIGS. 1 and 2 are introduced to illustrate the principles of the present invention only. Various features, aspects, limitations and the like discussed with respect to the illustrative embodiments thereof are not intended and should not be construed to restrict the broad scope of the present invention.

To begin, mobile station 105 generates a first call and selects a wireless channel 140 for communication with BTS 110 (step 305). Selected channel 140 communicates the incoming call to BSS 115 via BTS 110 and one of communications trunks 145 (step 310).

BSS 115 determines, in response to mobile station 105 call, whether MSC 125 can efficiently hunt for trunks for this call (step 310). Such selective relief, may be determined on a call by call, current capacity/utilization, statistical trend analysis of BSS 115 or MSC 125 capacity/utilization, or any other suitable basis.

For instance, in one embodiment of the present invention, MSC 125 bypasses hunting and BSS 115 hunts only when MSC 125 and BSS 115 are compatible. "Compatible," for purposes of the present invention, means that MSC 125 and BSS 115 can cooperate to reassign the hunting task between MSC and BSS. "Compatible," for practical purposes, also means that MSC 125 and BSS 115 were manufactured by the same company or in accordance with a common configuration, standard, protocol or the like. Thus, one of BSS 115 or MSC 125 may incorporate the principles of the present invention, while the other does not; under such circumstance, the supporting one of BSS 115 or MSC 125 may "deactivate" the unsupported all or some of the features of the implementation.

If BSS 115 determines that MSC 125 will hunt for trunks for the incoming call (YES branch of step 310), then BSS 115, via TSI 160 and modules 165, communicates the existence of the call to MSC 125 via STU 120, MSC 125 hunts for and selects suitable trunks 150, 155 and communicates the same to BSS 115 via STU 120 (step 320). BSS 115, again via TSI 160 and module 165, communicates the call to MSC 125 over selected trunks 150, 155 (step 325). As in the prior examples, the incoming channel over communications trunk 145 is channel A and the outgoing channel over communications trunk 150 is channel E; this results in connection A–E through BSS 115 via module 165a.

If BSS 115 determines that it will hunt for trunks for the incoming call (NO branch of step 310), then BSS 115, via a signaling controller 330 associated with BSS 115, sends a command signal to MSC 125 causing MSC 125 to bypass hunting for available channels (step 335). In one embodiment, the command signal is a conventional signaling or call processing message. Those skilled in the art are familiar with their use in today's telecommunications systems, and the present invention can make use of such messaging to reassign the hunting task to BSS 115.

MSC 125 acknowledges, in response to the command signal, bypassing of the hunting to BSS 115 and, more particularly, signaling controller 330 (step 340). In one embodiment, MSC 125 acknowledges the bypassing of the hunting with a message. Those skilled in the art will understand that messaging is not required, and that the command signal and its acknowledgment may be a communication via any conventional electrical path.

BSS 115, via a trunk hunting controller 345 associated with BSS 115, enabled when MSC 125 acknowledges the bypassing of the hunting, hunts trunk lines 150, 155 for available channels to carry art the incoming call from BSS 115 to MSC 125 (step 350). Again, trunk hunting controller 345 is capable of utilizing trunk lines 150, 155 more efficiently than MSC 125.

BSS 115, again via TSI 160 and module 165, communicates the call to MSC 125 over selected trunks 150, 155 (step 325). Unlike the prior examples, the incoming channel over communications trunk 145 is channel B and the outgoing channel over communications trunk 150 is channel F; this results in connection B–F through BSS 115 via module 165a. This is an optimal selection that allows reuse of connection A–E, conserving communications system resources (e.g., connection B–F) and subrate switching resources (e.g., same module 165). Signaling controller 330 and trunk hunting controller 345 cooperatively increase trunk utilization by employing BSS 115 to hunt for channels in trunks 150, 155 that are to carry calls outbound from BSS 115. Controllers 330 and 345 are arguably afforded a better view of how resources within BSS 115 are being used and how marginal requirements for those resources can be accommodated in a most efficient manner—such as selectively releasing MSC 125 from channel hunting to perform other vital tasks associated with routing calls.

Note that those skilled in the art should be familiar with the use of the above-described controllers in communications environments. Such controllers may be implemented in software, firmware, hardware, or some suitable combination of at least two of the three. In one embodiment of the present invention, trunk hunting controller 345 is embodied in a sequence of software instructions executable in a suitable conventional processor, or cooperative group thereof, associated with BSS 115. Similarly, MSC 125 may be associated with one or more processors that are highly utilized, particularly, as compared to the one or more processors of BSS 115. The present invention can therefore not only place the "hunting task" in the device best able to perceive a "proper" channel allocations should be, but may also serve to relieve MSC 125 processor(s) of the task of performing a centralized hunting function.

In addition, and referring to the above-introduction of CIC, particularly into messages that are compatible with conventional GSM infrastructures, once BSS 115 hunts, this feature requires a minor change to the GSM BSSAP protocol between ESS 115 and MSC 125. The required change is to include CIC (information element) to a COMP_L3 INFO message from BSS 115, and for MSC 125 to "echo" the same back when it sends a BSSMAP_CHAN_ASN_REQ message. CIC identifies the selected mobile station 105 originated trunk 145 by BSS 115.

With respect to MSC 125, when CIC is present in a "Layer 3 INFO" message, MSC 125 saves CIC, bypasses trunk hunting for the mobile station originated call, marks the trunk "busy" and proceeds with the existing protocol. CIC can be echoed when MSC 125 sends the BSSAP CHAN_ASSIGN_REQ, if so desired. CIC is preferably included as an option to the COMP_L3_INFO message.

Although the principles of the present invention have been described in detail through the above-illustrated embodiments, those skilled in the art should understand that they can make various changes, substitutions and alterations herein without departing from the spirit and scope of the invention in its broadest form.

What is claimed is:

1. A system, associated with a wireless base station system (BSS) coupled to a mobile service center (MSC) via a plurality of trunk lines, that allows said BSS to hunt said plurality of trunk lines for available channels to carry calls from said BSS to said MSC, comprising:

a signaling controller, associated with said BSS, that sends a command signal to said MSC to cause said MSC to bypass hunting for said available channels, said MSC acknowledging bypassing of said hunting to said signaling controller; and a trunk hunting controller, associated with said BSS, that is enabled when said MSC acknowledges said bypassing of said hunting to allow said BSS to hunt said plurality of trunk lines for said available channels to carry said calls from said BSS to said MSC, said trunk hunting controller capable of utilizing said trunk lines more efficiently than said MSC.

2. The system as recited in claim 1 wherein said MSC bypasses said hunting and said trunk hunting controller allows said BSS to hunt only when said MSC and said BSS are compatible.

3. The system as recited in claim 1 wherein said available channels are subrate channels in said trunk lines.

4. The system as recited in claim 1 wherein said command signal is a message.

5. The system as recited in claim 1 wherein said MSC acknowledges said bypassing of said hunting with a message.

6. The system as recited in claim 1 wherein a speech transcoder unit (STU) is interposed between said BSS and said MSC.

7. The system as recited in claim 1 wherein said trunk hunting controller is embodied in a sequence of software instructions executable in a processor of said BSS, said MSC freed of having to execute a similar sequence of software instructions to hunt said plurality of trunk lines for said available channels.

8. A method, performable in conjunction with a wireless base station system (BSS) coupled to a mobile service center (MSC) via a plurality of trunk lines, that allows said BSS to hunt said plurality of trunk lines for available channels to carry calls from said BSS to said MSC, comprising the steps of:

sending a command signal to said MSC to cause said MSC to bypass hunting for said available channels, said MSC acknowledging bypassing of said hunting; and enabling a trunk hunting controller associated with said BSS when said MSC acknowledges said bypassing of said hunting to allow said BSS to hunt said plurality of trunk lines for said available channels to carry said calls from said BSS to said MSC, said trunk hunting controller capable of utilizing said trunk lines more efficiently than said MSC.

9. The method as recited in claim 8 wherein said step of enabling is performed only when said MSC and said BSS are compatible.

10. The method as recited in claim 8 wherein said available channels are subrate channels in said trunk lines.

11. The method as recited in claim 8 wherein said command signal is a message.

12. The method as recited in claim 8 further comprising the step of acknowledging said bypassing of said hunting with a message.

13. The method as recited in claim 8 wherein a speech transcoder unit (STU) is interposed between said BSS and said MSC.

14. The method as recited in claim 8 wherein said method is performed by executing a sequence of software instructions in a processor of said BSS, said MSC freed of having to execute a similar sequence of software instructions to hunt said plurality of trunk lines for said available channels.

15. A Groupe Speciale Mobile (GSM) wireless infrastructure, comprising:

a mobile service center (MSC) having an MSC processor executing a sequence of MSC software instructions that allows said MSC to hunt for available channels for incoming calls;

a plurality of wireless mobile stations;

a plurality of wireless base station systems (BSSs) coupled to said MSC via a plurality of trunk lines and couplable to said plurality of wireless mobile stations via wireless links, each of said plurality of trunk lines containing a plurality of channels, each of said plurality of BSSs having associated therewith a BSS processor and a system to allow said BSS to hunt said plurality of channels for available channels to carry calls from said plurality of wireless mobile stations to said MSC via said BSS in lieu of said MSC, said system including:

a signaling controller, associated with said BSS, that sends a command signal to disable said MSC software instructions to cause said MSC to bypass hunting for said available channels, said MSC sending an acknowledging message to said signaling controller, and a trunk hunting controller, associated with said BSS and embodied in a sequence of MSC software instructions executable on said BSS processor, that is enabled when said MSC sends said acknowledging message to allow said BSS to hunt said plurality of trunk lines for said available channels to carry said calls from said BSS to said MSC, said trunk hunting controller capable of utilizing said trunk lines more efficiently than said MSC.

16. The infrastructure as recited in claim 15 wherein said MSC bypasses said hunting and said trunk hunting controller allows said BSS to hunt only when said MSC and said BSS are compatible.

17. The infrastructure as recited in claim 15 wherein said available channels are subrate channels in said trunk lines.

18. The infrastructure as recited in claim 15 wherein a plurality of speech transcoder units (STUs) are interposed between said plurality of BSSs and said MSC.

19. The infrastructure as recited in claim 15 wherein said MSC comprises a 5ESS switch.

20. The infrastructure as recited in claim 15 wherein each of said plurality of BSSs further has subrate switching equipment associated therewith, said trunk hunting controller capable of controlling said subrate switching equipment.

* * * * *